(12) United States Patent
Jang

(10) Patent No.: US 7,123,904 B2
(45) Date of Patent: Oct. 17, 2006

(54) METHOD FOR RECEPTION AND PROCESSING OF INCOMING CALLS AND MESSAGING SERVICES IN A MOBILE COMMUNICATION TERMINAL BASED ON RELEVANT CONDITIONS

(75) Inventor: Deok Hwan Jang, Gunpo-Si (KR)

(73) Assignee: Curitel Communications, Inc., Kyungki-Do (KR)

( * ) Notice: Subject to any disclaimer, the term of this patent is extended or adjusted under 35 U.S.C. 154(b) by 50 days.

(21) Appl. No.: 10/817,177

(22) Filed: Apr. 4, 2004

(65) Prior Publication Data

US 2005/0064854 A1    Mar. 24, 2005

(30) Foreign Application Priority Data

Sep. 22, 2003    (KR) ................ 10-2003-0065555

(51) Int. Cl.
 *H04M 3/42* (2006.01)
(52) U.S. Cl. .............. 455/415; 455/410; 455/411; 455/418
(58) Field of Classification Search ........ 455/415, 455/410, 411, 418, 422.1
 See application file for complete search history.

(56) References Cited

U.S. PATENT DOCUMENTS 6,889,048 B1* 5/2005 Koo ............... 455/452.1
2001/0009863 A1* 7/2001 Kim ............... 455/567
2003/0185372 A1* 10/2003 Henz ............... 379/207.02
2003/0215078 A1* 11/2003 Brahm et al. ........ 379/211.02
2005/0086494 A1* 4/2005 Carley ............... 713/182

FOREIGN PATENT DOCUMENTS

KR  1020000037072  7/2000
KR  1020030033563  5/2003

* cited by examiner

*Primary Examiner*—Joseph Feild
*Assistant Examiner*—Huy Nguyen
(74) *Attorney, Agent, or Firm*—Ohlandt, Greeley, Ruggiero & Perle, L.L.P.

(57) ABSTRACT

A method capable of setting the receiving condition of a mobile communication terminal for an incoming call, Short Message Service (SMS) or Multi-media Message Service (MMS) in advance, is provided. In one embodiment of the present invention, a user of the mobile communication terminal can set the receiving condition for the incoming call, SMS or MMS differently in each CID and each time zone, so that the incoming call, SMS or MMS transmitted from a CID is processed to be received or reception-rejected by user's set conditions. According to the present invention, the user may conduct effective service reception management under a special user environment for terminals such as while asleep or at a meeting, etc.

2 Claims, 3 Drawing Sheets

METHOD FOR RECEPTION AND PROCESSING OF INCOMING CALLS AND MESSAGING SERVICES IN A MOBILE COMMUNICATION TERMINAL BASED ON RELEVANT CONDITIONS

CROSS-REFERENCE TO RELATED APPLICATION

The entire disclosure of Korean Patent Application No. 10-2003-0065555 filed on Sep. 22, 2003 including specification, claims, drawings and summary is incorporated herein by reference in its entirety.

BACKGROUND OF THE INVENTION

1. Field of the Invention

The present invention relates to a method for the reception and processing of incoming calls and messaging services in a mobile communication terminal, and more particularly to a method for the reception and processing of incoming calls and messaging services in a mobile communication terminal based on relevant conditions, according to which the priority and the time condition are specified for each caller identification (CID) according to the relevant individual and specific circumstances so that incoming calls, Short Message Services (SMSs) or Multi-media Message Service (MMSs) may be processed to be accepted or rejected based upon the relevant conditions.

2. Description of the Prior Art

With the recent development of mobile communication technology, mobile communication terminals gradually have been equipped with various intelligent functions other than the simple call services. For example, mobile communication terminals these days may provide the caller ID (CID) function displaying the caller information (e.g., caller name, phone number, etc.) on the liquid crystal display (LCD) window so that the recipient or receiver may appropriately deal with unwanted calls, prank calls or indecent calls.

However, even though the CID function of these mobile communication terminals is widely used, in the related art, the only measure that a recipient can take upon receiving an unwanted call has been not answering the call. Accordingly, such caller inconveniently had to listen to the incoming bell sound for some time which is generated regardless of the recipient's intent to answer the call.

Further, there may be cases where a person wants to selectively accept calls, SMSs or MMSs from certain specific parties only depending on said person's current circumstances. However, in the relevant art, mobile communication terminals could provide only such services that merely restrict reception of calls or messages from certain group or enable the recipient to reject calls or messages generally upon checking CID information. Mobile communication terminals in the relevant could not provide services that could enable recipients to efficiently respond to calls or messages in the given individual and specific circumstances.

For example, a person in the middle of a meeting or a person who is sleeping may want to selectively accept only calls, SMSs or MMSs from certain specific callers or senders in order to avoid unnecessary disturbance. However, mobile communication terminals in the relevant art could not accommodate the demand of such person. Thus, it is necessary to provide a function through which recipients or receivers can selectively accept only certain calls, SMSs or MMSs according to the relevant individual and specific circumstances by using the CID information.

BRIEF SUMMARY OF THE INVENTION

Accordingly, the present invention has been made to solve the above-mentioned problems occurring in the prior art, and an object of the present invention is to provide a method for the reception and processing of incoming calls and messaging services in a mobile communication terminal, according to which the priority and the time condition are set for each caller identification (CID) so that incoming calls, Short Message Services (SMSs) or Multi-media Message Services (MMSs) may be processed appropriately upon referring to the relevant priority and time condition.

Another object of the present invention is to provide a method for the reception and processing of incoming calls and messaging services in a mobile communication terminal, according to which the priority and the time condition are set and managed for each CAD so that an incoming call, SMS or MMS received at a specific time point may be selectively accepted or rejected according to the relevant preset priority or time condition and that different reception processing may be performed even for calls, SMSs or MMSs received from the same CID according to the relevant priority and time condition.

Further Object of the present invention is to provide a method for the reception and processing of incoming calls and messaging services in a mobile communication terminal, according to which the priority and time condition are set for each CID so that different reception processing may be performed for different CID, thereby effectively protecting personal privacy and enabling effective service reception management under a special user environment such as in a case where the user is in a meeting or is sleeping, etc.

In order to accomplish these objects, there is provided a method for the reception and processing of incoming calls and messaging services in a mobile communication terminal based on relevant conditions, the method comprising: setting the priority and time condition for the service reception and processing for each CID and managing the same in the mobile communication terminal; and upon the reception of a service having certain CID information, checking the priority and time condition for the corresponding CID and accepting or rejecting the received service according to the relevant priority and time condition.

Herein, said setting and managing the priority and time condition is conducted by registering/de-registering CIDs classified as certain groups or individual CIDs and setting, registering and managing the priority for the reception processing at certain specific time condition when registering each CID or CID group.

Also, said accepting or rejecting the received service comprises: upon the reception of an incoming call, SMS or MMS from a caller or sender, extracting CID information from the received service message; searching the priority and time condition set for the CID indicated in the extracted CID information and checking the priority for the CID at the present condition; and accepting or rejecting the incoming call, SMS or MMS according to the checked priority.

Said accepting or rejecting according to the checked priority is conducted by: if the priority is set as "high", accepting the service irrespective of the present reception mode set in the mobile communication terminal; if the priority is set as "middle", accepting the service according to the present reception mode set in the mobile communication terminal; and if the priority is set as "low", rejecting the service irrespective of the present reception mode set in the mobile communication terminal.

Also, the method for the reception and processing of incoming calls and messaging services in a mobile communication terminal based on relevant conditions further comprises: upon the reception of a service with certain CID information while using a specific service in the mobile communication terminal in which the priority and time condition are set for each CID, checking the priority and time condition for the CID indicated in said CID information; and determining whether or not the specific service will be proceeded continuously and accepting or rejecting the received service according to the checked priority and time condition of the said CID.

Herein, said accepting or rejecting the received service is conducted by: if the priority for said CID at the present time is set as "high", stopping the current proceeding of the specific service and accepting the received service; if the priority for said CID at the present time is set as "middle", displaying on an LCD window a message setting forth said CID information and asking whether or not to accept the received service, and accepting or rejecting the received service according to the instruction of the user of the terminal; and if the priority for said CID at the present time is set as "low", rejecting the received service and continuing to proceed the current specific service.

BRIEF DESCRIPTION OF THE DRAWINGS

The above and other objects, features and advantages of the present invention will be more apparent from the following detailed description taken in conjunction with the accompanying drawings, in which.

DETAILED DESCRIPTION OF THE PREFERRED EMBODIMENTS

Hereinafter, a preferred embodiment of the present invention will be described with reference to the accompanying drawings.

Figure 1:
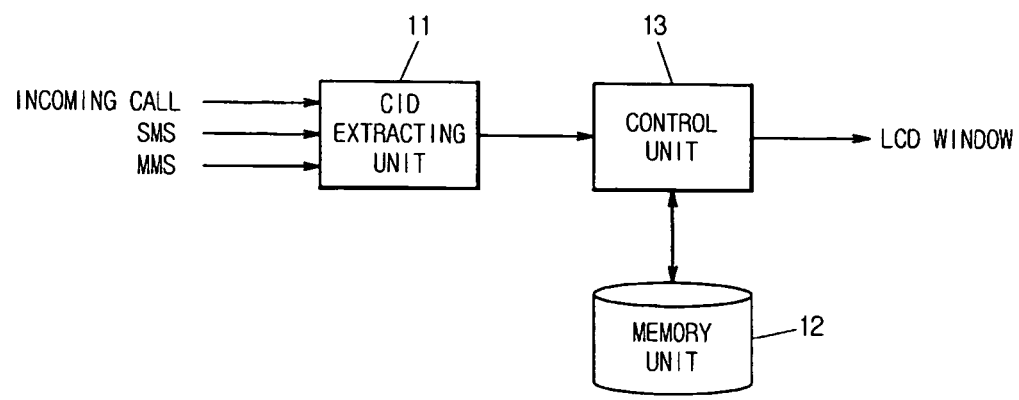
FIG. 1 is an internal constructional block diagram for the reception and processing based upon relevant conditions in a mobile communication terminal according to the present invention.

In a mobile communication terminal of the present invention, the priority and time condition are set for each CID and services such as the incoming calls, SMSs or MMSs are selectively accepted or rejected according the relevant conditions. An internal construction of a mobile communication terminal for performing such reception and processing includes a CID extracting unit 11, a memory unit 12 and a control unit 13 as shown in FIG. 1.

The CID extracting unit 11 extracts CID information from the message of an incoming call, SMS or MMS received in the terminal and transmits the CID information to the control unit 13. The memory unit 12 stores the priority and time condition corresponding to the each CID information set in order to determine whether to accept or reject an incoming call, SMS or MMS upon receiving it.

The control unit 13 searches the priority and time condition stored in the memory unit 12 using the CID information transmitted from the CID extracting unit 11 to check the priority and time condition for the incoming call, SMS or MMS received in the terminal, so that the corresponding incoming call, SMS or MMS may be processed to be accepted or rejected according to the priority and time condition.

Figure 2:
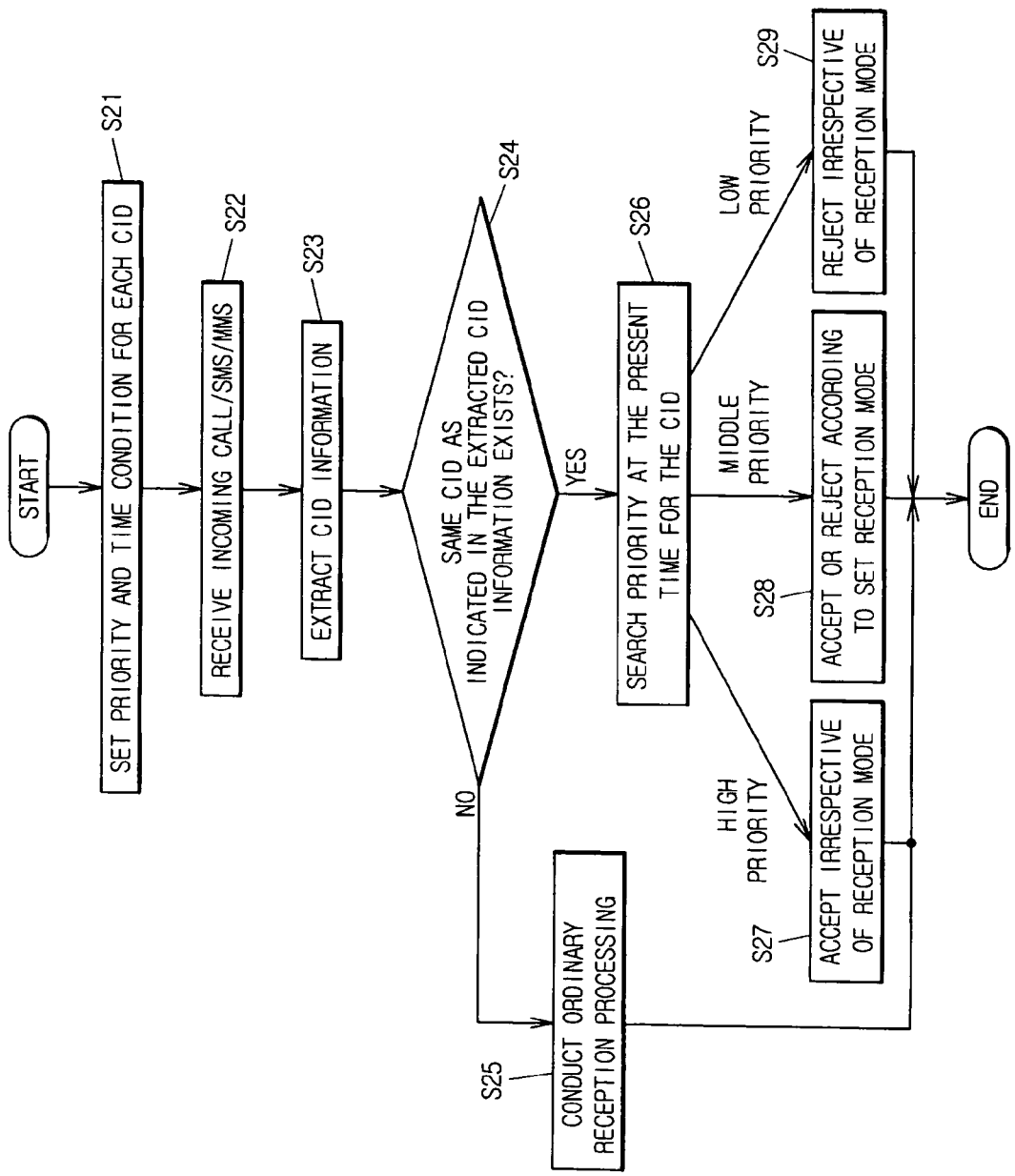
FIG. 2 is a flow chart illustrating the operation for the reception and processing based upon relevant conditions in a mobile communication terminal according to the present invention.

The operation of the reception and processing based upon relevant conditions in such mobile communication terminal will be now described with reference to FIG. 2.

According to the present invention, different reception and processing can be conducted for the same CID according to relevant conditions by setting the priority and time condition corresponding to CID information. Also, different reception and processing can be conducted even at a special situation such as during a meeting, etc. according to the priority. For this purpose, first, the priorities (for example, high, middle and low) are set for CID groups or for individual CIDs and time conditions (for example, from 9 a.m. to 6 p.m.) are set for such priorities of the CID groups or individual CIDs (Step S21). That is, a terminal user registers/de-registers groups of CIDs or individual CIDs, sets priorities for the reception and processing at specific time conditions when registering the corresponding CIDs, and stores them in the memory unit 12 and manages them. Herein, various time conditions can be set for one CID and different priorities can be set for different time conditions of such one CID. For example, during the morning (or at a meeting, at business hours, etc.), the priority for certain CID may be set as "low" and thus a service received from such CID can be rejected but in the afternoon (or upon termination of a meeting, after business hours, etc.), the priority for the same CID may be set as "high" and thus a service received from said CID can be accepted.

If a service such as the incoming call, SMS or MMS is received from a certain caller or sender where priorities and time conditions have been set for the respective CIDs in a mobile communication terminal through the foregoing procedure (Step S22), the CID extracting unit 11 extracts CID information from the message of the incoming call, SMS or MMS and transmits the same to the control unit 13 (Step S23).

Then, the control unit 13 searches the memory unit 12 in which the priorities and time conditions for the respective CIDs are stored to check whether or not there is the CID in the memory unit 12 that matches the CID information extracted from the presently received incoming call, SMS or MMS, by using the CID information transmitted from the CID extracting unit 11 (Step S24).

At this time, if it is determined that the same CID does not exist, it means that the priority and time condition has not been set for that CID. Thus, the control unit 13 performs the general reception and processing for the incoming call, SMS or MMS (Step S25).

In contrast, if it is determined from the search of the memory unit 12 at the step S24 that the same CID exists, it means that the priority and time condition has been set for that CID. Thus, the control unit 13 searches the priority for the CID at the present time condition, that is, the priority information under the current time condition (Step S26), and accepts or rejects the corresponding service of the incoming call, SMS or MMS according to the searched priority.

For example, if the searched priority for the CID at the present is "high", incoming bell sound is outputted, accepting the incoming service irrespective of the current reception mode (i.e., manner mode or other mode) of the mobile communication terminal. In this manner, an incoming call, SMS or MMS service from a caller or sender who is set as important by the terminal user (i.e., the CID with high priority) is processed to be accepted irrespective of whether it is during a meeting, etc. (Step S27).

If the searched present priority the CID is "middle", the corresponding CID information is displayed on the LCD window and is accepted or rejected according to the present reception mode. Thus, an incoming call, SMS or MMS service from the other party whose priority is "middle" is processed to be selectively accepted or rejected by the terminal user according to the relevant conditions such as a meeting, etc. (Step S28).

If the searched present priority for the CID is "low", the incoming service is rejected irrespective of the present reception mode. Thus, an incoming call, SMS or MMS from the other party who is set as unimportant (i.e., the CID with low priority) is rejected by the terminal user (Step S29). Preferably, after the expiration of the time condition for the corresponding CID, the CID information for the rejected incoming call, SMS or MMS service is displayed on the LCD window, thereby enabling the terminal user to check the rejected incoming call, SMS or MMS service after the relevant condition such as a meeting is terminated.

Figure 3:
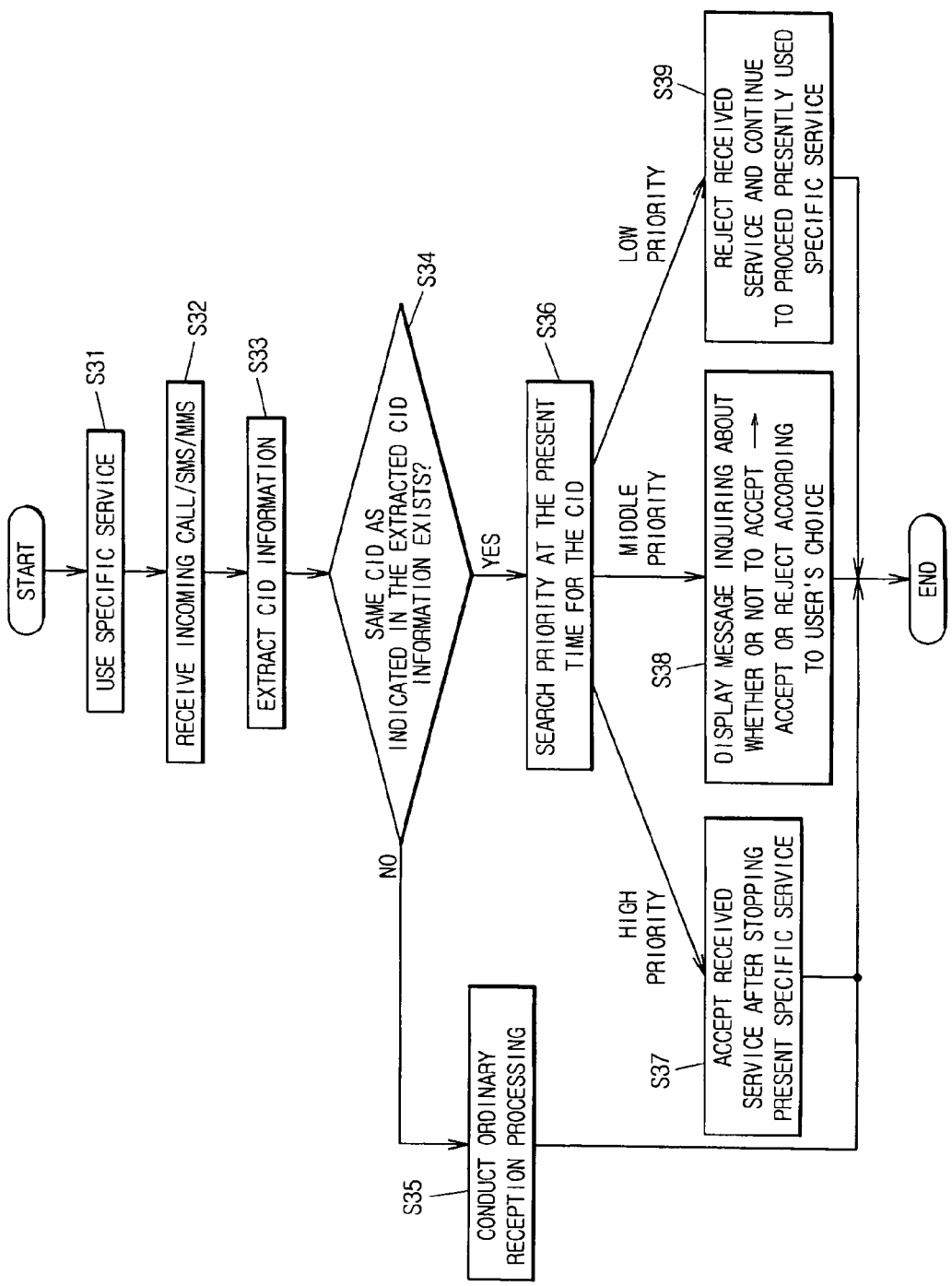
FIG. 3 is a flow chart illustrating the operation of the reception and processing based upon relevant conditions in a mobile communication terminal during using a specific service according to the present invention.

Further, according to the present invention, even in a case where a specific service is being provided to the mobile communication terminal, the above-described reception processing according to relevant conditions can be implemented, which will now be described with reference to FIG. 3.

For example, if the terminal user is using a specific service, for example, the Wireless Application Protocol (WAP) surfing service (Step S31), when a service such as an incoming call, SMS or MMS from a certain caller or sender is received (Step S32) while using the WAP surfing service, the CID extracting unit 11 extracts the CID information from the presently received incoming call, SMS or MMS message thus to transmit the same to the control unit 13 (step S33).

Then, using the CID information transmitted from the CID extracting unit 11, the control unit 13 searches the memory unit 12 in which the priorities and time conditions for the respective CIDs are stored thus to check whether or not there is the same CID as the CID included in the CID information extracted from the presently received incoming message, SMS or MMS message (Step S34). If it is determined that there is no such CID in the memory unit 12, which means that the priority and time condition for that CID have not been set, the control unit 13 conducts ordinary reception processing for a general incoming call, SMS or MMS (Step S35).

On the other hand, if it is determined at the step S34 that there exists the CID in the memory unit 12, which means that the priority and time condition for the corresponding CID have been set, the control unit 13 searches the priority for the CID at the present time condition (Step S36), and accepts or rejects the corresponding service of the incoming call, SMS or MMS according to the searched priority.

For example, if the searched priority for the CID at the present time is set as "high", the WAP surfing service presently proceeded in the terminal is temporary stopped and the presently received incoming call, SMS or MMS service is accepted. In this manner, an incoming call, SMS or MMS from a caller or sender who is set as important by the terminal user (i.e., the CID with high priority) is processed to be accpeted even while a certain specific service is used (Step S37).

If the searched priority for the CID at the present time is "middle", the corresponding CID information a message inquiring about whether or not the terminal user will accept the received service are displayed on the LCD window. In this manner, an incoming call, SMS or MMS may be accepted or rejected according to the choice of the terminal user (Step S38).

If the searched priority for the CID at the present time is "low", the presently received incoming call, SMS or MMS is rejected and the specific service presently proceeded continues to be proceeded (Step S39). Preferably, after the termination of the corresponding specific service, the CID information for the rejected incoming call, SMS or MMS is displayed on the LCD window, thereby enabling the terminal user to check the incoming call, SMS or MMS rejected during the specific service.

As described above, the present invention provides a method for the reception and processing of incoming calls and messaging services in a mobile communication terminal wherein the priority and time condition are set for each CID so that an incoming call, SMS or MMS received at a specific time point may be processed to be selectively accepted or rejected according to the preset priority or time condition for the incoming call, SMS or MMS and that different reception procedures may be performed even for the same CID according to the relevant priority and time conditions.

Also, the present invention provides a method for the reception and processing of incoming calls and messaging services in a mobile communication terminal wherein the priority and time condition are set for each CID so that different reception procedures may be performed based upon the relevant priorities and conditions, thereby effectively protecting personal privacy and enabling effective service reception management under a special terminal ser environment such as in a case where the user is in a meeting or is sleeping.

Although preferred embodiments of the present invention have been described for illustrative purposes, those skilled in the art will appreciate that various modifications, additions and substitutions are possible, without departing from the scope and spirit of the invention as disclosed in the accompanying claims. For example, if multiple incoming calls, SMSs or MMSs are received simultaneously at a specific time point, the present invention may implement the present invention to deal with such multiple services by, for example, accepting the one with the highest priority first among them.

What is claimed is:

1. A method for reception and processing of services in a mobile communication terminal based on relevant conditions, the method comprising:

setting the priority and time condition for the service reception and processing for each caller identification (CID) and managing the same in the mobile communication terminal;

extracting caller identification (CID) information from the received service message upon the reception of an incoming call, SMS or MMS from a certain caller or sender;

searching the priority and time condition set for the caller identification (CID) indicated in the extracted caller identification (CID) information and checking the priority for the caller identification (CID) at the present condition; and accepting or rejecting the incoming call, SMS or MMS according to the checked priority, wherein said accepting or rejecting is conducted by:

if the priority is set as "high", accepting the service irrespective of the present reception mode set in the mobile communication terminal;

if the priority is set as "middle", accepting the service according to the present reception mode set in the mobile communication terminal; and if the priority is set as "low", rejecting the service irrespective of the present reception mode set in the mobile communication terminal.

2. A method for reception and processing of services in a mobile communication terminal based on relevant conditions, the method comprising:

setting the priority and time condition for the service reception and processing for each caller identification (CID) and managing the same in the mobile communication terminal;

checking the priority and time condition for the caller identification (CID) indicated in said caller identification (CID) information upon the reception of a service with certain caller identification (CID) information while using a specific service in the mobile communication terminal in which the priority and time condition are set for each caller identification (CID); and determining whether or not the specific service will be proceeded continuously and accepting or rejecting the received service according to the checked priority and time condition of the caller identification (CID), wherein said determining and accepting or rejecting of the received service are conducted by:

if the priority for the caller identification (CID) at the present time is set as "high", stopping the current proceeding of the specific service and accepting the received service;

if the priority for the caller identification (CID) at the present time is set as "middle", displaying on an LCD window a message setting forth said caller identification (CID) information and asking whether or not to accept the received service, and accepting or rejecting the received service according to the instruction of the user of the terminal; and if the priority for the caller identification (CID) at the present time is set as "low", rejecting the received service and the continuing to proceed the current specific service.

* * * * *